United States Patent
Sizemore et al.

(10) Patent No.: US 11,520,985 B2
(45) Date of Patent: Dec. 6, 2022

(54) NAMED ENTITY RECOGNITION

(71) Applicant: INTERNATIONAL BUSINESS MACHINES CORPORATION, Armonk, NY (US)

(72) Inventors: Robert Christian Sizemore, Fuquay-Varina, NC (US); Sterling Richardson Smith, Apex, NC (US); David Gerard Herbeck, Rochester, MN (US); David Blake Werts, Charlotte, NC (US)

(73) Assignee: International Business Machines Corporation, Armonk, NY (US)

( * ) Notice: Subject to any disclaimer, the term of this patent is extended or adjusted under 35 U.S.C. 154(b) by 266 days.

(21) Appl. No.: 16/527,101

(22) Filed: Jul. 31, 2019

(65) Prior Publication Data
US 2021/0034702 A1 Feb. 4, 2021

(51) Int. Cl.
*G06F 40/295* (2020.01)
*G06F 40/242* (2020.01)
*G06F 40/253* (2020.01)
*G06V 10/40* (2022.01)
*G06V 30/10* (2022.01)

(52) U.S. Cl.
CPC .......... *G06F 40/295* (2020.01); *G06F 40/242* (2020.01); *G06F 40/253* (2020.01); *G06V 10/40* (2022.01); *G06V 30/10* (2022.01)

(58) Field of Classification Search
None
See application file for complete search history.

(56) References Cited

U.S. PATENT DOCUMENTS

| 5,423,032 A * | 6/1995 | Byrd ..................... G06F 16/313 704/1 |
| 9,588,960 B2 | 3/2017 | Nekhay |
| 10,896,222 B1 * | 1/2021 | Christodoulopoulos .................... G06F 40/295 |

(Continued)

FOREIGN PATENT DOCUMENTS

| CN | 104298714 B | 12/2017 |
| CN | 108108344 A | 6/2018 |

OTHER PUBLICATIONS

Dolan et al., "Automatically deriving structured knowledge bases from on-line dictionaries." In Proceedings of the First Conference of the Pacific Association for Computational Linguistics, pp. 5-14. Vancouver: Pacific Association for Computational Linguistics, 1993. (Year: 1993).*

(Continued)

*Primary Examiner* — Frank D Mills
(74) *Attorney, Agent, or Firm* — Cantor Colburn LLP; Kelsey M. Skodje

(57) ABSTRACT

Embodiments include methods, systems and computer program products for performing named entity recognition. Aspects include obtaining a text having a plurality of words and comparing each of the plurality of words to a dictionary. Aspects also include creating, based on the comparison, an annotation for at least one of the plurality of words that the least one of the plurality of words refers to a named entity. Aspects further include parsing the text to identify a part of speech for each of the plurality of words and removing the annotations from each of the at least one of the plurality of words that has a part of speech that is not one or a noun and a noun supporting adjective.

14 Claims, 4 Drawing Sheets

(56) References Cited

U.S. PATENT DOCUMENTS

| | | | | |
|---|---|---|---|---|
| 2009/0144609 | A1* | 6/2009 | Liang | G06F 40/10 |
| | | | | 715/230 |
| 2014/0163951 | A1* | 6/2014 | Nikoulina | G06F 40/295 |
| | | | | 704/4 |
| 2017/0308524 | A1* | 10/2017 | Bhatt | G06F 16/285 |
| 2018/0365211 | A1* | 12/2018 | Xu | G06F 40/242 |
| 2020/0004815 | A1* | 1/2020 | Weisberg | G06K 9/00469 |

OTHER PUBLICATIONS

Finkel, Jenny Rose, and Christopher D. Manning. "Nested named entity recognition." In Proceedings of the 2009 conference on empirical methods in natural language processing, pp. 141-150. 2009. (Year: 2009).*

Al-Rfou, Rami, and Steven Skiena. "SpeedRead: A fast named entity recognition pipeline." arXiv preprint arXiv:1301.2857 (2013). (Year: 2013).*

Baluja, Shumeet, Vibhu O. Mittal, and Rahul Sukthankar. "Applying machine learning for high-performance named-entity extraction." Computational Intelligence 16, No. 4 (2000): 586-595. (Year: 2000).*

Shang, Jingbo, Liyuan Liu, Xiang Ren, Xiaotao Gu, Teng Ren, and Jiawei Han. "Learning named entity tagger using domain-specific dictionary." arXiv preprint arXiv: 1809.03599 (2018). (Year: 2018).*

Mell, Peter et al. "The NIST Definition of Cloud Computing" Recommendations of the National Institute of Standards and Technology; U.S. Dept. of Commerce, Special Publication 800-145; Sep. 2011; 7 pgs.

* cited by examiner

NAMED ENTITY RECOGNITION

BACKGROUND

The present invention generally relates to performing named entity recognition, and more specifically, to improving the precision of named entity recognition using part of speech information.

Currently, both dictionary and rule-based named entity recognition method are used to process text and to tag/annotate words in the processed text as being the name of a person or a place. Current named entity recognition methods compare processed text to dictionary definitions and use rules to identify text as being a person or a place. However, current dictionary and rule-based named entity recognition suffers from a lack of precision as there are many names and locations that can be ambiguous.

SUMMARY

Embodiments of the present invention are directed to performing named entity recognition. A non-limiting example computer-implemented method includes obtaining a text having a plurality of words and comparing each of the plurality of words to a dictionary. The method also includes creating an annotation for at least one of the plurality of words that the least one of the plurality of words refers to a named entity based on the comparison. The method also includes parsing the text to identify a part of speech for each of the plurality of words and removing the annotations from each of the at least one of the plurality of words that has a part of speech that is not one or a noun and a noun supporting adjective.

Other embodiments of the present invention implement features of the above-described method in computer systems and computer program products.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

The diagrams depicted herein are illustrative. There can be many variations to the diagrams or the operations described therein without departing from the spirit of the invention. For instance, the actions can be performed in a differing order or actions can be added, deleted or modified.

Also, the term "coupled" and variations thereof describes having a communications path between two elements and does not imply a direct connection between the elements with no intervening elements/connections between them. All of these variations are considered a part of the specification.

DETAILED DESCRIPTION

One or more embodiments of the present invention provide improved method for performing named entity recognition. In exemplary embodiments, each word in a text looked up in a dictionary and an annotation is created for each word when the dictionary indicates that the word refers to a name of a place or a person, i.e., a named entity. In one embodiment, after the set of annotations is created, the text is processed to identify the part of speech associated with each word in the text. In other embodiments, this processing can be applied only to the words with annotations that indicate that the word is a named entity. The annotations for words that are neither a noun nor a noun supporting adjective are removed, creating an updated set of named entity annotations. In exemplary embodiments, by removing these person and location annotations for non-noun nor a noun supporting adjectives the number of false positives included in the named entity annotations is reduced.

Figure 1:
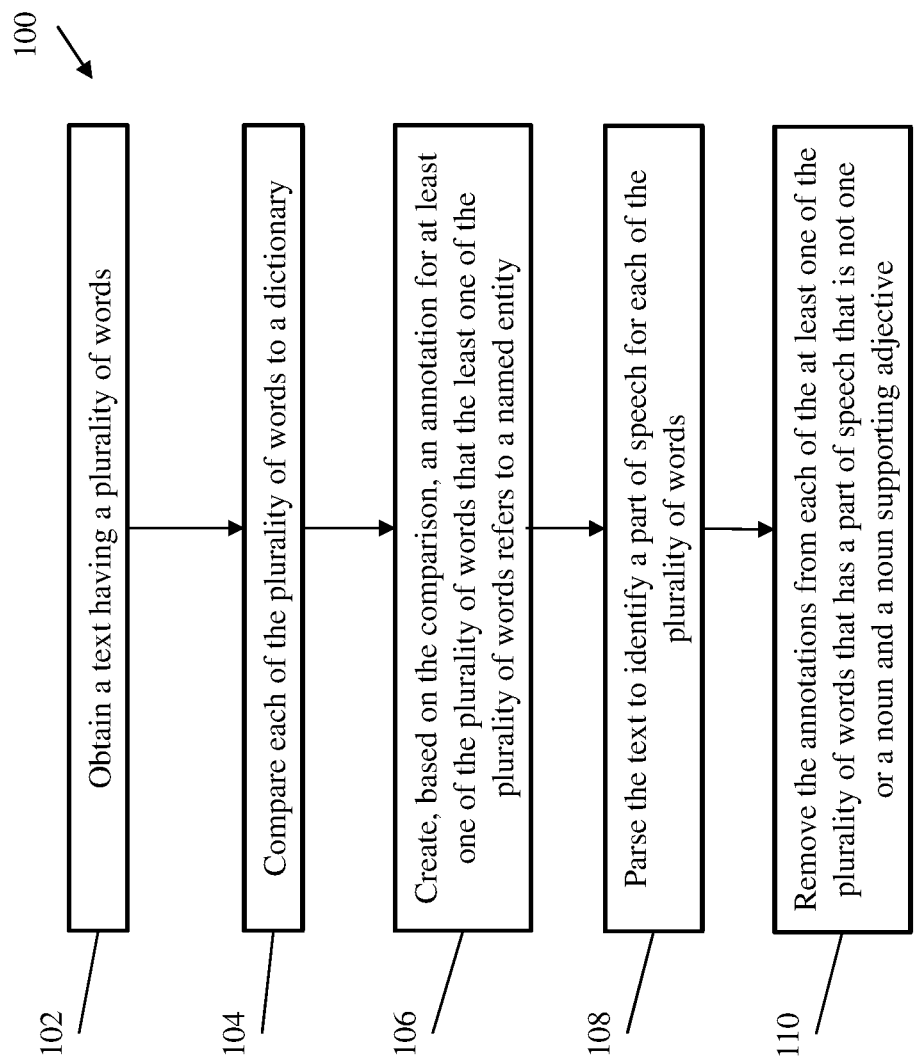
FIG. 1 illustrates a flow diagram of a method for performing named entity recognition in accordance with one or more embodiments of the present invention.

Turning now to FIG. 1, a flow diagram of a method 100 for performing named entity recognition in accordance with an embodiment is shown. In one or more embodiments of the present invention, the method 100 may be embodied in software that is executed by computer elements located within a network that may reside in the cloud, such as the cloud computing environment 50 described hereinabove and illustrated in FIGS. 2 and 3. In other embodiments, the computer elements may reside on a computer system or processing system, such as the processing system 200 described hereinabove and illustrated in FIG. 2, or in some other type of computing or processing environment.

As illustrated, the method 100 begins at block 102 and includes obtaining a text having a plurality of words. In one embodiment, obtaining the text includes performing optical character recognition (OCR) on a plurality of images. For example, the text may be an article or book that has been scanned and OCRed. In another example, the text can be obtained from an electronic source such as a website, word processing document, or the like. Next, as shown at block 104, the method 100 includes comparing each of the plurality of words to a dictionary to determine if the word refers to a named entity. In one embodiment, a named entity is one of a place and a person. In one embodiment, comparing each of the plurality of words to a dictionary includes performing natural language processing on a definition in the dictionary for each of the plurality of words. In another embodiment, comparing each of the plurality of words to a dictionary includes extracting an indication that the word refers to a named entity from the definition in the dictionary. In exemplary embodiments, when the dictionary includes multiple definitions for a word, each of the various definitions are analyzed.

The method 100 also includes creating, based on the comparison, an annotation for at least one of the plurality of words that the least one of the plurality of words refers to a named entity, as shown at block 106. In exemplary embodiments, the annotation includes a definition obtained from the dictionary. In one embodiment, the annotation, including one or more extracted definitions from the dictionary, are stored for further processing. Next, as shown at block 108, the method 100 includes parsing the text to identify a part of speech for each of the plurality of words. In some embodiments, the part of speech is identified for only the words that have annotations which indicate that the word refers to a named entity. In exemplary embodiments, parsing the text to identify the part of speech for each of the plurality of words includes performing a part of speech tagging software. In one embodiment, the part of speech tagging software is the ENGLISH SLOT GRAMMAR PARSER™ offered by International Business Machines. In other embodiments, other part of speech tagging software can be used.

After the part of speech for the words of the text are identified, the method 100 includes removing the annotations from each of the at least one of the plurality of words that has a part of speech that is not one or a noun and a noun supporting adjective, as shown at block 110. In one embodiment, once the annotations are removed, the remaining set of annotations are stored in a metadata file associated with the text. In one embodiment, each of the stored annotations includes the word, an identified part of speech of the word, and one or more definitions extracted from the dictionary for the word.

In exemplary embodiments, by identifying words that are annotated as referring to a named entity, i.e., words that refer to either a person or location, that are not nouns or a noun supporting adjective, a significant amount of false positive indications of the terms being persons or people can be avoided. For example, in the sentence 'Early in the month she had concerned about possible perforated septum' dictionary based named entity recognition methods would improperly identify 'Early' as referring to a place. However, by applying part of speech recognition in addition to the dictionary based named entity recognition method, this false positive is avoided. In another example, in the sentence 'White blood cell count is 7.6, hemoglobin 12.6, hematocrit 37.5, and platelets 287,000' dictionary based named entity recognition methods would improperly identify 'White' as referring to a place. However, by applying part of speech recognition in addition to the dictionary based named entity recognition method, this false positive is avoided. In further examples, in the sentences "The trip was to the Smith General Store" and "She use the highlighter to mark up the paper" dictionary based named entity recognition methods would improperly identify the terms 'Smith' and 'mark' as referring to a person. However, by applying part of speech recognition in addition to the dictionary based named entity recognition method, these false positives are avoided.

In exemplary embodiments, applying part of speech filtering to dictionary-based named entity recognition based method results in an approximate precision improvement of ten percent in properly identifying person annotations and an approximate precision improvement of forty-five percent in properly identifying location annotations, as compared to traditional dictionary based named entity recognition based methods.

Additional processes may also be included. It should be understood that the processes depicted in FIG. 1 represents an illustration, and that other processes may be added or existing processes may be removed, modified, or rearranged without departing from the scope and spirit of the present disclosure.

Figure 2:
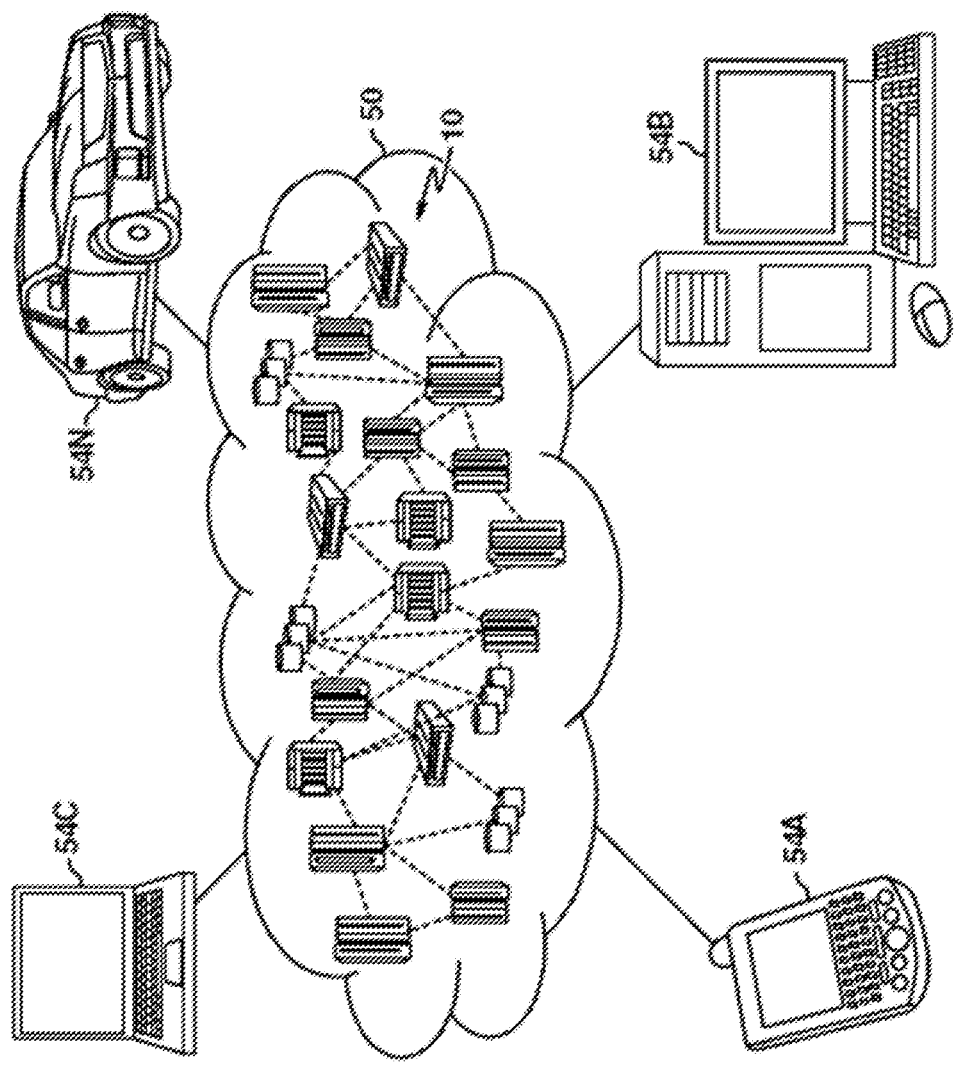
FIG. 2 illustrates a cloud computing environment according to one or more embodiments of the present invention.
Figure 3:
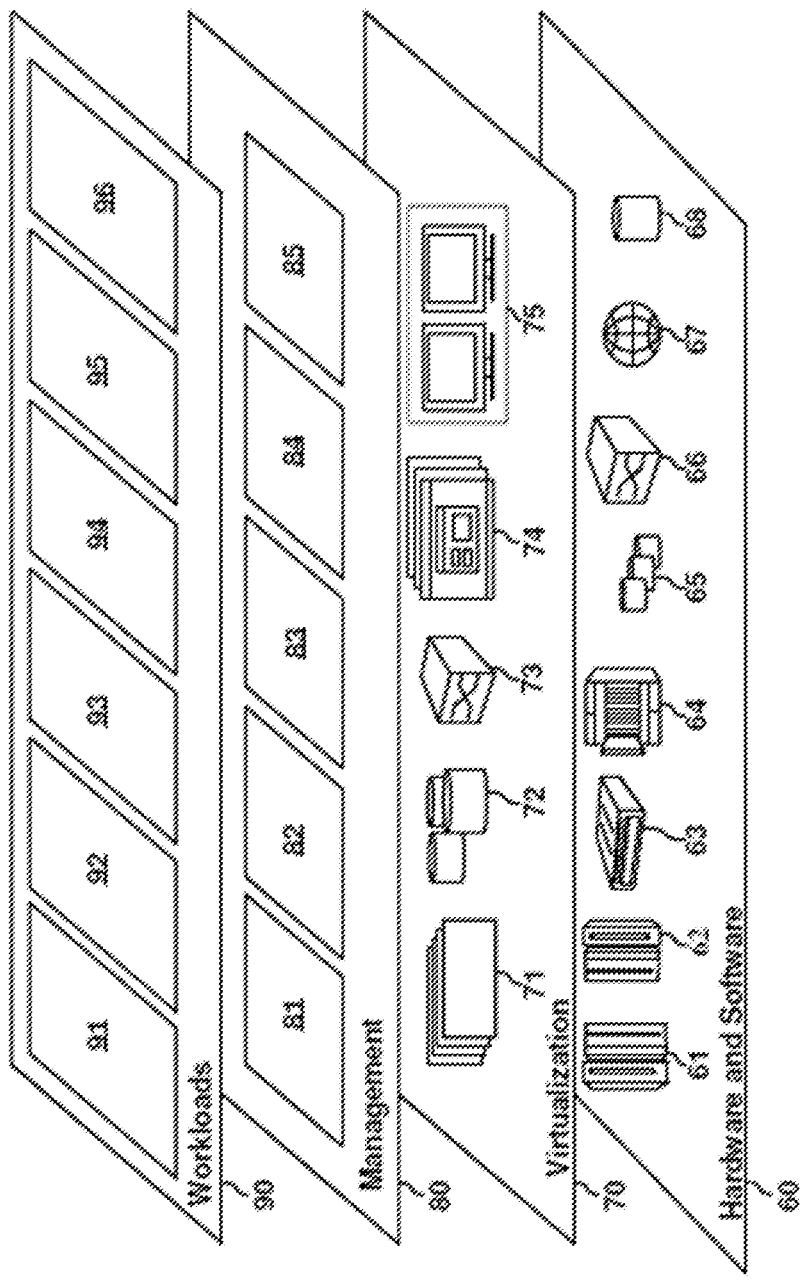
FIG. 3 illustrates abstraction model layers according to one or more embodiments of the present invention.

FIG. 2 depicts a cloud computing environment according to one or more embodiments of the present invention. FIG. 3 depicts abstraction model layers according to one or more embodiments of the present invention.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (S3S): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (P3S): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (I3S): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 2, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and facilitating an auction of hyper-local data sets for performing named entity recognition 96.

Figure 4:
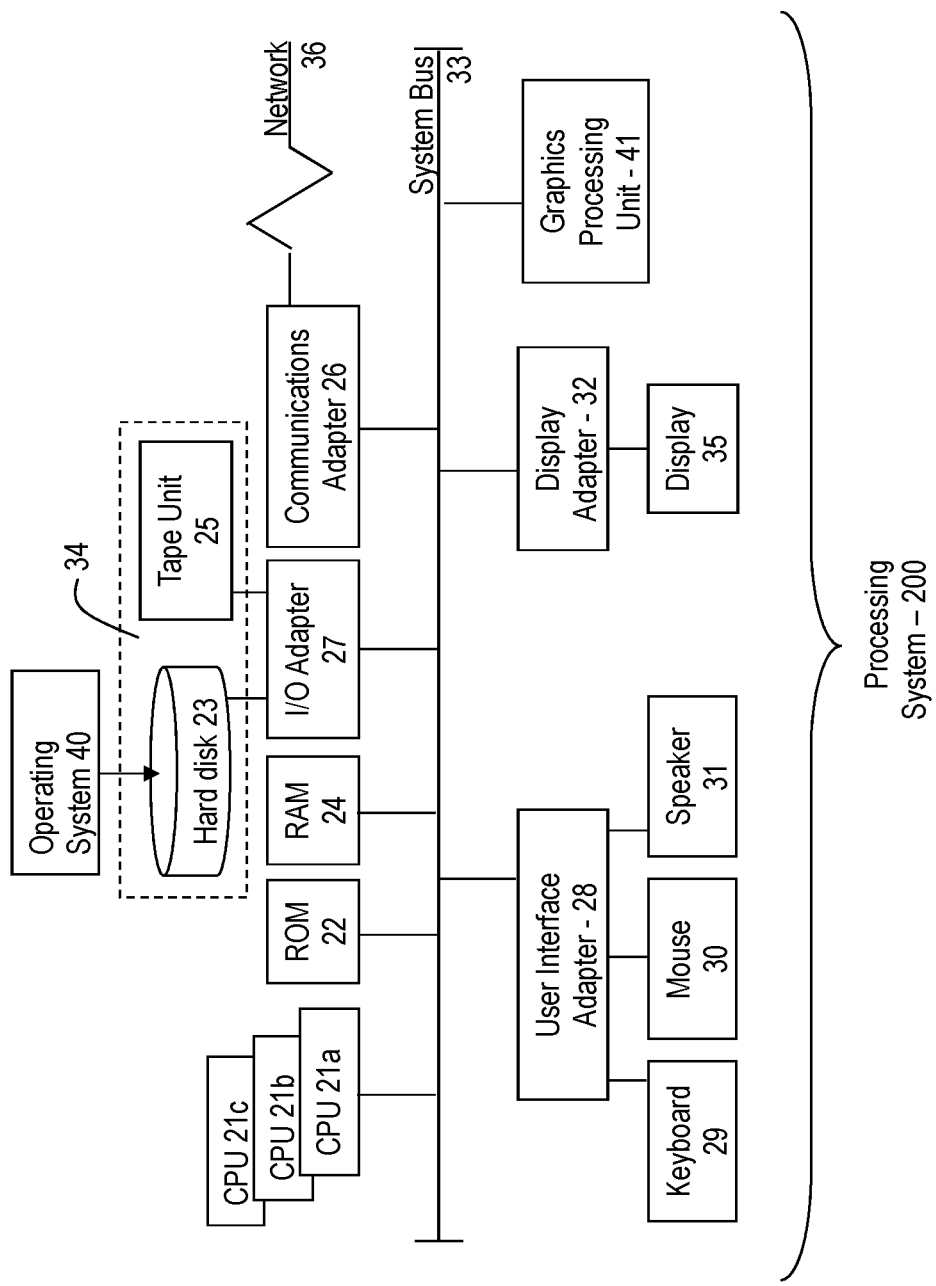
FIG. 4 illustrates a block diagram of a computer system for use in implementing one or more embodiments of the present invention.

FIG. 4 depicts a processing system for implementing one or more embodiments of the present invention. It is understood that one or more embodiments of the present invention are capable of being implemented in conjunction with any other type of computing environment now known or later developed. For example, FIG. 4 depicts a block diagram of a processing system 200 for implementing the techniques described herein. In accordance with one or more embodiments of the present invention, system 200 is an example of a cloud computing node 10 of FIG. 2. In the embodiment shown in FIG. 4, processing system 200 has one or more central processing units (processors) 21a, 21b, 21c, etc. (collectively or generically referred to as processor(s) 21 and/or as processing device(s)). According to one or more embodiments of the present invention, each processor 21 can include a reduced instruction set computer (RISC) microprocessor. Processors 21 are coupled to system memory (e.g., random access memory (RAM) 24) and various other components via a system bus 33. Read only memory (ROM) 22 is coupled to system bus 33 and can include a basic input/output system (BIOS), which controls certain basic functions of processing system 200.

Further illustrated are an input/output (I/O) adapter 27 and a communications adapter 26 coupled to system bus 33. I/O adapter 27 can be a small computer system interface (SCSI) adapter that communicates with a hard disk 23 and/or a tape storage drive 25 or any other similar component. I/O adapter 27, hard disk 23, and tape storage device 25 are collectively referred to herein as mass storage 34. Operating system 40 for execution on processing system 200 can be stored in mass storage 34. The RAM 24, ROM 22, and mass storage 34 are examples of memory 19 of the processing system 200. A network adapter 26 interconnects system bus 33 with an outside network 36 enabling the processing system 200 to communicate with other such systems.

A display (e.g., a display monitor) 35 is connected to system bus 33 by display adaptor 32, which can include a graphics adapter to improve the performance of graphics intensive applications and a video controller. According to one or more embodiments of the present invention, adapters 26, 27, and/or 32 can be connected to one or more I/O busses that are connected to system bus 33 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 33 via user interface adapter 28 and display adapter 32. A keyboard 29, mouse 30, and speaker 31 can be interconnected to system bus 33 via user interface adapter 28, which can include, for example, a Super I/O chip integrating multiple device adapters into a single integrated circuit.

According to one or more embodiments of the present invention, processing system 200 includes a graphics processing unit 37. Graphics processing unit 37 is a specialized electronic circuit designed to manipulate and alter memory to accelerate the creation of images in a frame buffer intended for output to a display. In general, graphics processing unit 37 is very efficient at manipulating computer graphics and image processing and has a highly parallel structure that makes it more effective than general-purpose CPUs for algorithms where processing of large blocks of data is done in parallel.

Thus, as configured herein, processing system 200 includes processing capability in the form of processors 21, storage capability including system memory (e.g., RAM 24), and mass storage 34, input means such as keyboard 29 and mouse 30, and output capability including speaker 31 and display 35. According to one or more embodiments of the present invention, a portion of system memory (e.g., RAM 24) and mass storage 34 collectively store an operating system such as the AIX® operating system from IBM Corporation to coordinate the functions of the various components shown in processing system 200.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

One or more of the methods described herein can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

In some embodiments, various functions or acts can take place at a given location and/or in connection with the operation of one or more apparatuses or systems. In some embodiments, a portion of a given function or act can be performed at a first device or location, and the remainder of the function or act can be performed at one or more additional devices or locations.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The present disclosure has been presented for purposes of illustration and description, but is not intended to be exhaustive or limited to the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

The diagrams depicted herein are illustrative. There can be many variations to the diagram or the steps (or operations) described therein without departing from the spirit of the disclosure. For instance, the actions can be performed in a differing order or actions can be added, deleted or modified. Also, the term "coupled" describes having a signal path between two elements and does not imply a direct connection between the elements with no intervening elements/ connections therebetween. All of these variations are considered a part of the present disclosure.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one"

and "one or more" are understood to include any integer number greater than or equal to one, i.e. one, two, three, four, etc. The terms "a plurality" are understood to include any integer number greater than or equal to two, i.e. two, three, four, five, etc. The term "connection" can include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A method for performing named entity recognition, the method comprising:
    obtaining a text having a plurality of words;
    comparing each of the plurality of words to a dictionary, wherein comparing each of the plurality of words to a dictionary includes performing natural language processing on a definition in the dictionary to determine whether each of the plurality of words refers to a named entity;
    creating, based on the comparison, an annotation for at least one of the plurality of words that refer to the named entity, wherein the annotation includes the definition obtained from the dictionary;
    parsing only a portion of the text to identify a part of speech, wherein the portion of the text consists of the annotated words; and
    removing the annotations from each of the at least one of the plurality of words that has a part of speech that is not one of a noun and a noun supporting adjective.

2. The method of claim 1, wherein the named entity consists of one of a place and a person.

3. The method of claim 1, further comprising storing the text with a metadata file that includes the remaining annotations.

4. The method of claim 1, wherein parsing the text to identify the part of speech for each of the plurality of words includes performing a part of speech tagging algorithm.

5. The method of claim 1, wherein obtaining the text includes performing optical character recognition on a plurality of images.

6. A system comprising:
    a memory having computer readable instructions; and
    one or more processors for executing the computer readable instructions, the computer readable instructions controlling the one or more processors to perform operations comprising:
        obtaining a text having a plurality of words;
        comparing each of the plurality of words to a dictionary, wherein comparing each of the plurality of words to a dictionary includes performing natural language processing on a definition in the dictionary to determine whether each of the plurality of words refers to a named entity;;
    creating, based on the comparison, an annotation for at least one of the plurality of words that refer to the named entity, wherein the annotation includes the definition obtained from the dictionary;
    parsing only a portion of the text to identify a part of speech, wherein the portion of the text consists of the annotated words; and
    removing the annotations from each of the at least one of the plurality of words that has a part of speech that is not one of a noun and a noun supporting adjective.

7. The system of claim 6, wherein the named entity consists of one of a place and a person.

8. The system of claim 6, wherein the operations further comprise storing the text with a metadata file that includes the remaining annotations.

9. The system of claim 6, wherein parsing the text to identify the part of speech for each of the plurality of words includes performing a part of speech tagging algorithm.

10. The system of claim 6, wherein obtaining the text includes performing optical character recognition on a plurality of images.

11. A computer program product comprising a computer readable storage medium having program instructions embodied therewith, the program instructions executable by a computer processor to cause the computer processor to perform a method comprising:
    obtaining a text having a plurality of words;
    comparing each of the plurality of words to a dictionary, wherein comparing each of the plurality of words to a dictionary includes performing natural language processing on a definition in the dictionary to determine whether each of the plurality of words refers to a named entity;
    creating, based on the comparison, an annotation for at least one of the plurality of words that refer to the named entity, wherein the annotation includes the definition obtained from the dictionary;
    parsing only a portion of the text to identify a part of speech, wherein the portion of the text consists of the annotated words; and
    removing the annotations from each of the at least one of the plurality of words that has a part of speech that is not one of a noun and a noun supporting adjective.

12. The computer program product of claim 11, wherein the named entity consists of one of a place and a person.

13. The computer program product of claim 11, wherein the method further comprises storing the text with a metadata file that includes the remaining annotations.

14. The computer program product of claim 11, wherein parsing the text to identify the part of speech for each of the plurality of words includes performing a part of speech tagging algorithm.

* * * * *